(12) United States Patent
Mitsutake et al.

(10) Patent No.: US 6,229,646 B1
(45) Date of Patent: *May 8, 2001

(54) PLATE-LIKE POLARIZING ELEMENT, A POLARIZING CONVERSION UNIT PROVIDED WITH THE ELEMENT, AND A PROJECTOR PROVIDED WITH THE UNIT

(75) Inventors: Hideaki Mitsutake, Tokyo; Noritaka Mochizuki, Yokohama; Shigeru Kawasaki, Atsugi; Kazumi Kimura, Atsugi; Junko Shingaki, Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,622

(22) Filed: Jul. 24, 1996

Related U.S. Application Data

(62) Division of application No. 08/163,564, filed on Dec. 8, 1993, now Pat. No. 5,566,367, which is a continuation of application No. 07/865,312, filed on Apr. 8, 1992, now abandoned.

(30) Foreign Application Priority Data

Apr. 9, 1991 (JP) .................................................. 3-103334

(51) Int. Cl.[7] ...................................................... G02B 5/30
(52) U.S. Cl. .............................. 359/487; 359/497; 349/96
(58) Field of Search ..................................... 359/487, 495, 359/497, 500; 353/30, 31, 34, 48, 49; 349/95, 96

(56) References Cited

U.S. PATENT DOCUMENTS

| | | | |
|---|---|---|---|
| 2,748,659 | * 6/1956 | Geffeken et al. | 359/495 |
| 2,810,324 | 10/1957 | Marks . | |
| 4,560,999 | 12/1985 | Tokuhara . | |
| 4,850,685 | * 7/1989 | Kamakura et al. | 353/31 |
| 4,864,390 | 9/1989 | McKechnie et al. . | |
| 4,989,076 | 1/1991 | Owada et al. . | |
| 5,098,184 | 3/1992 | van den Brandt | 353/102 |
| 5,264,897 | * 11/1993 | Shikama | 353/31 |

FOREIGN PATENT DOCUMENTS

| | | | |
|---|---|---|---|
| C935663 | 1/1956 | (DE) . | |
| 1372436 | * 8/1964 | (FR) | 359/495 |
| 61-102893 | 5/1986 | (JP) . | |
| 61-90584 | 5/1986 | (JP) . | |
| 63-182987 | * 7/1988 | (JP) . | |
| 3-114027 | 5/1991 | (JP) . | |

OTHER PUBLICATIONS

European Patent Office: Patent Abstracts of Japan, Publication #: JP62059919, Date: Mar. 16, 1987.

* cited by examiner

Primary Examiner—Darren Schuberg
(74) Attorney, Agent, or Firm—Morgan & Finnegan LLP

(57) ABSTRACT

This specification discloses a plate-like polarizing element for converting light into polarized light having a plurality of units arranged along a common plane across the light, each of the units being provided with dividing means for dividing the light into reflected light and transmitted light whose planes of polarization are orthogonal to each other, varying means for varying the polarized state of at least one of the reflected light and the transmitted light to thereby make the planes of polarization of the two lights coincident with each other, and reflecting means for reflecting one of the reflected light and the transmitted light and directing it substantially in the same direction as the direction of travel of the other. The specification also discloses a polarizing conversion unit provided with such plate-like polarizing element, and a projector provided with such unit.

40 Claims, 10 Drawing Sheets

PPIOR ART

PLATE-LIKE POLARIZING ELEMENT, A POLARIZING CONVERSION UNIT PROVIDED WITH THE ELEMENT, AND A PROJECTOR PROVIDED WITH THE UNIT

This is a divisional of application Ser. No. 08/163,564, now U.S. Pat. No. 5,566,367, filed Dec. 8, 1993 which is a Continuation of application Ser. No. 07/865,312 filed on Apr. 8, 1992, now abandoned.

BACKGROUND OF THE INVENTION

1. Field of the Invention

This invention relates to a plate-like polarizing element, a polarizing conversion unit provided with the element, and a projector provided with the unit.

2. Related Background Art

As an apparatus for converting non-polarized light having a random plane of polarization into polarized light, an apparatus described in Japanese Laid-Open Patent Application No. 61-90584 is shown in FIG. 1 of the accompanying drawings.

In this projector, non-polarized parallel light emerging from a condenser lens 104 enters a polarizing beam splitter 111, and P-polarized light $L_P$ is intactly transmitted through the acting surface (evaporated film formed on an inclined surface on which two rectangular prisms are adhesively secured to each other) 111a of the polarizing beam splitter 111, while S-polarized light $L_S$ is upwardly reflected at a right angle and enters a total reflection prism 112. The S-polarized light $L_S$ is rightwardly reflected at a right angle by the total reflection prism 112, whereby it emerges from the total reflection prism 112 in the same direction as the P-polarized light $L_P$ transmitted through the polarizing beam splitter 111. The S-polarized light $L_S$ refers to rectilinearly polarized light having a plane of polarization parallel to the acting surface 111a of the polarizing beam splitter 111, and the P-polarized light $L_P$ refers to rectilinearly polarized light having a plane of polarization orthogonal to the S-polarized light $L_S$. A half wavelength plate 113 is disposed on the emergence side of the total reflection prism 112, and the S-polarized light $L_S$ which has emerged from the total reflection prism 112 is transmitted through the half wavelength plate 113, whereby the plane of polarization thereof is rotated by 90° and the S-polarized light $L_S$ is converted into P-polarized light $L_P^*$. Also, wedge type lenses 114 and 115 for changing optical path are disposed on the emergence sides of the polarizing beam splitter 111 and the half wavelength plate 113, respectively, and the P-polarized light $L_P$ transmitted through the polarizing beam splitter 111 and the P-polarized light $L_P^*$ converted by the half wavelength plate 113 have their optical paths changed, and intersect each other at a point $P_O$ on the incidence side surface of a liquid crystal light bulb 117 and become combined light.

Accordingly, in this projector, the liquid crystal light bulb 117 can be illuminated by both of the S-polarized light $L_S$ and the P-polarized light $L_P$ separated by the polarizing beam splitter 111. However, the above-described projector of Japanese Laid-Open Patent Application No. 61-90584 requires the large polarizing beam splitter 111 and total reflection prism 112, and this leads to the disadvantage that the entire apparatus becomes bulky and heavy.

SUMMARY OF THE INVENTION

It is the object of the present invention to provide a plate-like polarizing element which can cause non-polarized light emitted from a light source to enter an image generator without any loss and can contribute to the compactness of a projector, a projector, a polarizing conversion unit provided with the element, and a projector provided with the unit.

The plate-like polarizing element of the present invention comprises a plurality of units each having a dividing portion for dividing incident light into reflected light and transmitted light whose planes of polarization are orthogonal to each other, a reflecting portion for reflecting one of said reflected light and said transmitted light and directing it substantially in the same direction as the direction of travel of the other, and a modulating portion for varying the plane of polarization of at least one of said reflected light and said transmitted light to thereby make the planes of polarization of the two coincident with each other, said units being juxtaposed.

The polarizing conversion unit of the present invention has the plate-like polarizing element of the present invention, and conversion means provided on the incidence side of the plate-like polarizing element for converting non-polarized light into non-polarized light of a fence-like pattern or converting non-polarized light into non-polarized light of a lattice-like pattern.

The projector of the present invention is such that the illuminating optical system thereof has the polarizing conversion unit of the present invention, or the image generator thereof has three generators for generating red, green and blue images, respectively, and the illuminating optical system has a color resolving system for resolving non-polarized light into red, green and blue non-polarized lights, and the polarizing conversion unit of the present invention provided in the optical path of the non-polarized light of each color.

Or the image generator has three generators for generating red, green and blue images, respectively, and the illuminating optical system has a color resolving system for resolving non-polarized light into red, green and blue non-polarized lights, and the polarizing conversion units of the present invention provided in the common optical path of two of non-polarized lights of three colors and the optical path of non-polarized light of the other color, respectively.

DESCRIPTION OF THE PREFERRED EMBODIMENTS

Some embodiments of the present invention will hereinafter be described with reference to the drawings.

Figure 2:
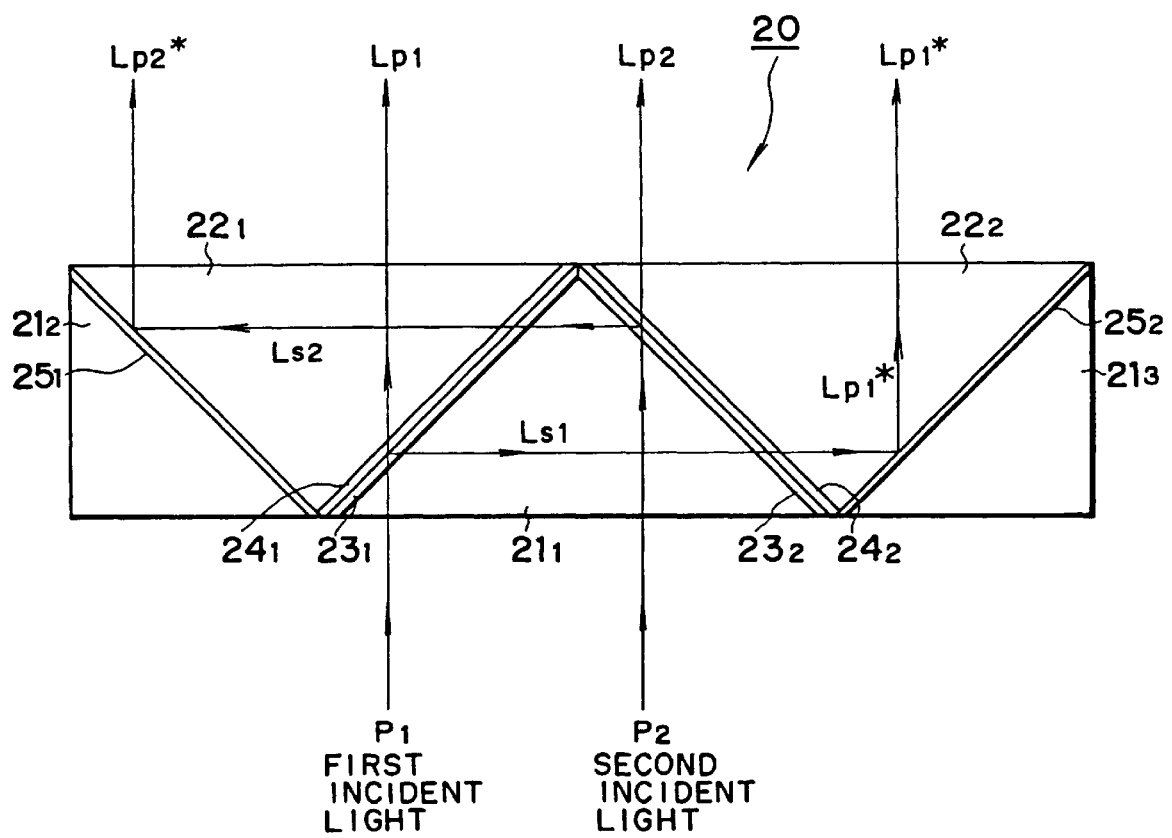
FIG. 2 is a construction view of the unit 20 of a plate-like polarizing element showing a first embodiment of the plate-like polarizing element of the present invention.

FIG. 2 is a construction view of the unit 20 of a plate-like polarizing element showing a first embodiment of the plate-like polarizing element of the present invention.

The unit 20 of the plate-like polarizing element of the present embodiment comprises a first incidence side prism $21_1$ having the shape of a triangle pole of right-angled triangular cross-section, first and second emergence side prisms $22_1$ and $22_2$ having the same shape as the first incidence side prism $21_1$ and disposed adjacent to the first incidence side prism $21_1$ with their inclined surfaces in contact with one another, a second incidence side prism $21_2$ having a half of the shape of the first incidence side prism $21_1$ and disposed on that side of the first emergence side prism $22_1$ opposite to the first incidence side prism $21_1$ with their inclined surfaces in contact with each other, and a third incidence side prism $21_3$ having the same shape of the second incidence side prism $21_2$ and disposed on that side of the second emergence side prism $22_2$ opposite to the first incidence side prism $21_1$ with their inclined surfaces in contact with each other, and the three incidence side prisms $21_1$–$21_3$ and the two emergence side prisms $22_1$ and $22_2$ together constitute a plane parallel plate. On the surface of contact between the first incidence side prism $22_1$ and the first emergence side prism $22_1$, a first quarter wavelength plate $23_1$ is provided on the first incidence side prism $21_1$ side, and first polarization separation acting film $24_1$ is provided on the first emergence side prism $22_1$ side. Further, on the surface of contact between the first incidence side prism $21_1$ and the second emergence side prism $22_2$, a second quarter wavelength plate $23_2$ is provided on the first incidence side prism $21_1$ side, and second polarization separation acting film $24_2$ is provided on the second emergence side prism $22_2$ side. A first total reflection mirror $25_1$ is formed on the surface of contact between the second incidence side prism $21_2$ and the first emergence side prism $22_1$, and a second total reflection mirror $25_2$ is formed on the surface of contact between the third incidence side prism $21_3$ and the second emergence side prism $22_2$. The first and second polarization separation acting films $24_1$ and $24_2$ have the characteristic of reflecting S-polarized light having a plane of polarization parallel to the film surface and transmitting therethrough P-polarized light having a plane of polarization perpendicular to the film surface. Also, the first and second quarter wavelength plates $23_1$ and $23_2$ act on light incident at an incidence angle of 45° like first and second incident lights $P_1$ and $P_2$, and the directions of the optical axis thereof are selected so as to convert S-polarized light into circularly polarized light.

That is, in the unit 20 of the plate-like polarizing element of the present embodiment, the surface of contact between the first incidence side prism $21_1$ and the first emergence side prism $22_1$ and the surface of contact between the first incidence side prism $21_1$ and the second emergence side prism $22_2$ function as a pair of polarizing dividing surfaces having substantially the same angles of inclination with respect to non-polarized light (first and second incident lights $P_1$ and $P_2$) and facing each other so that the reflected light from one of them (first and second S-polarized lights $L_{S1}$ and $L_{S2}$) may travel toward the other, and the first and second polarization separation acting films $24_1$ and $24_2$ function as a dividing portion which divides the incident light into reflected light (first and second S-polarized light $L_{S1}$ and $L_{S2}$) and transmitted light (first and second P-polarized lights $L_{P1}$ and $L_{P2}$) whose planes of polarization are orthogonal to each other. Also, the first and second total reflection mirrors $25_1$ and $25_2$ function as a reflecting portion which reflects one (first and second S-polarized lights $L_{S1}$ and $L_{S2}$) of the reflected light and the transmitted light) and directs it substantially in the same direction as the direction of travel of the other (first and second P-polarized lights $L_{P1}$ and $L_{P2}$). Further, the first and second quarter wavelength plates $23_1$ and $23_2$ function as a modulating portion which varies the plane of polarization of at least one (first and second S-polarized lights $L_{S1}$ and $L_{S2}$) of the reflected light and the transmitted light to thereby make the planes of polarization of the two lights coincident with each other.

The operation of the unit 20 of the plate-like polarizing element of the present embodiment will now be described.

The first incident light $P_1$ having a random plane of polarization which is incident at an incidence angle of 45° with respect to the surface of contact between the first incidence side prism $21_1$ and the first emergence side prism $22_1$ is divided into first P-polarized light $L_{P1}$ and first S-polarized light $L_{S1}$ by the first P-polarized light $L_{P1}$ which is transmitted through the first quarter wavelength plate $23_1$ and thereafter enters the first polarization separation acting film $24_1$ and has a plane of polarization perpendicular to the film surface being transmitted through the first polarization separation acting film $24_1$ and the first S-polarized light $L_{S1}$ which has a plane of polarization paralle to the film surface being reflected rightwardly at a right angle by the first polarization separation acting film $24_1$. The first P-polarized light $L_{P1}$ emerges from the exit surface of the first emergence side prism $22_1$. On the other hand, the first S-polarized light $L_{S1}$ is transmitted through the first quarter wavelength plate $23_1$ and is thereby converted into circularly polarized light, whereafter it is transmitted through the second quarter wavelength plate $23_2$ and is thereby converted into first converted P-polarized light $L_{P1}^*$ having a plane of polarization perpendicular to the film surface of the second polarization separation acting film $24_2$. The first converted P-polarized light $L_{P1}^*$ is transmitted through the second polarization separation acting film $24_2$, whereafter it is reflected upwardly at a right angle by the second total reflection mirror $25_2$ and emerges from the exit surface of the second emergence side prism $22_2$ in the same direction as the direction of travel of the first P-polarized light $L_{P1}$.

Also, the second incident light $P_2$ having a random plane of polarization which is incident at an incidence angle of 45° with respect to the surface of contact between the first incidence side prism $21_1$ and the second emergence side prism $22_2$ is divided into second P-polarized light $L_{P2}$ and second S-polarized light $L_{S2}$ by the second P-polarized light $L_{P2}$ which is transmitted through the second quarter wavelength plate $23_2$ and thereafter enters the second polarization separation acting film $24_2$ and has a plane of polarization perpendicular to the film surface being transmitted through the second polarization separation acting film $24_2$ and the second S-polarized light $L_{S2}$ which has a plane of polarization parallel to the film surface being reflected leftwardly at a right angle by the second polarization separation acting film $24_2$. The second P-polarized light $L_{P2}$ emerges from the exit surface of the second emergence side prism $22_2$. On the other hand, the second S-polarized light $L_{S2}$ is transmitted through the second quarter wavelength plate $23_2$ and is thereby converted into circularly polarized light, whereafter it is transmitted through the first quarter wavelength plate $23_1$ and is thereby converted into second converted P-polarized light $L_{P2}^*$ having a plane of polarization perpendicular to the film surface of the first polarization separation acting film $24_1$. The second converted P-polarized light $L_{P2}^*$ is transmitted through the first polarization separation acting film $24_1$, whereafter it is reflected upwardly at a right angle by the first total reflection mirror $25_1$ and emerges from the exit surface of the first emergence side prism $22_1$ in the same direction as the direction of travel of the second P-polarized light $L_{P2}$.

Accordingly, the unit 20 of the plate-like polarizing element of the present embodiment can convert the first and second incident lights $P_1$ and $P_2$ incident on the first incidence side prism $21_1$ into the first and second P-polarized lights $L_{P1}$ and $L_{P2}$ and the first and second converted P-polarized lights $L_{P1}^*$ and $L_{P2}^*$ without any loss and can cause them to emerge from the whole exit surface.

Description will now be made of the material of each constituent of the unit 20 of the plate-like polarizing element of the present embodiment.

The first, second and third incidence side prisms $21_1$–$21_3$ and the first and second emergence side prisms $22_1$ and $22_2$ can be formed of glass or plastic, but to keep the separating function of the first and second polarization separation acting films $24_1$ and $24_2$ optimal, those prisms may preferably be formed of glass having a great degree of freedom of refractive index selection. Also, a combination of plane parallel plates is possible instead of using prisms, but in such case, the transmittance of P-polarized light is inferior to the case where prisms are used. The first and second quarter wavelength plates $23_1$ and $23_2$ can be formed of a crystalline material such as mica or rock crystal, dilated high molecular film, low molecular liquid crystal having a predetermined thickness and oriented with the molecular axes thereof uniformized in a predetermined direction, side chain type high molecular liquid crystal or low molecular liquid crystal dispersed in high molecules. The first and second polarization separation acting films $24_1$ and $24_2$ can be formed of conventional optical multilayer film, but use can be made of any material having a polarization separation characteristic such as cholesteric liquid crystal. As the first and second total reflection mirrors $25_1$ and $25_2$, use may be made of aluminum evaporated mirrors, or the second and third incidence side prisms $21_2$ and $21_3$ can be eliminated and those inclined surfaces of the first and second emergence side prisms $22_1$ and $22_2$ which are opposite to the first incidence side prism $21_1$ can be made into air boundary surfaces to thereby form total reflection surfaces.

Figure 1:
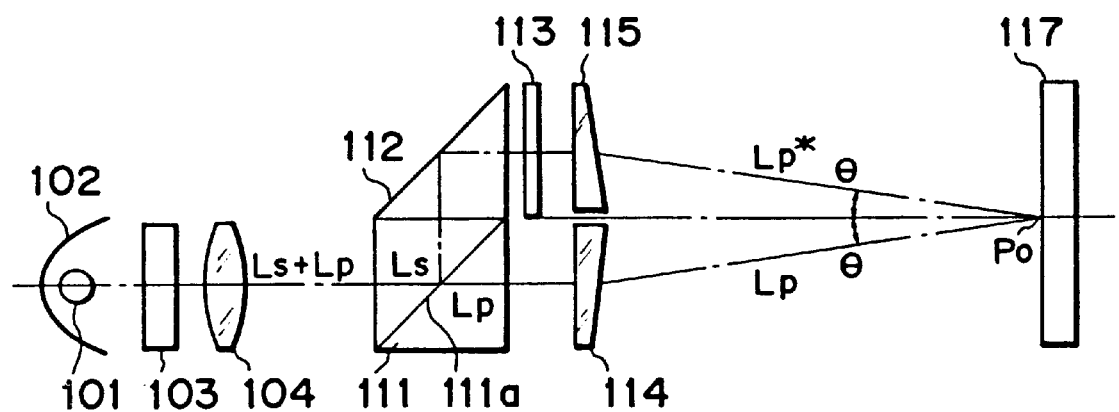
FIG. 1 shows the construction of the essential portions of a projector according to the prior art.

This unit 20 can be made thinner and lighter in weight than the combination of the polarizing beam splitter 111 and the total reflection prism 112 shown in FIG. 1, and thus leads to the possibility of realizing a compact and light-weight projector.

To construct a much thinner and lighter-weight polarizing element, the unit 20 can be made compact and a plurality of such units can be juxtaposed.

The polarizing element shown in FIG. 2, as compared with a polarizing element as shown later in FIG. 5 wherein wavelength plate is disposed parallel to the incident light, has the effect that no middle omission occurs to the emergent light. This is because if the wavelength plate is disposed parallel to the incident light, it is apparent that middle omission will occur correspondingly to the thickness of the wavelength plate.

Figure 3:
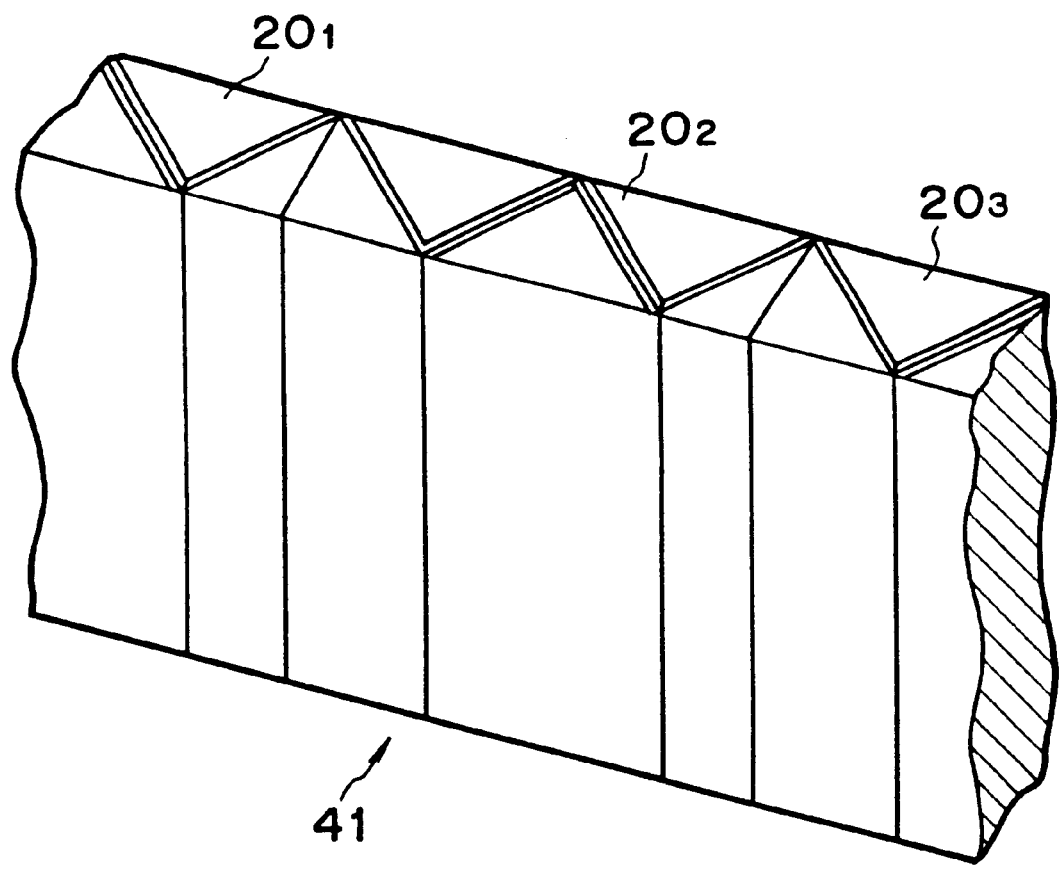
FIG. 3 is a fragmentary view showing an example of the construction of a plate-like polarizing element constructed by juxtaposing a plurality of units 20 shown in FIG. 2.
Figure 4:
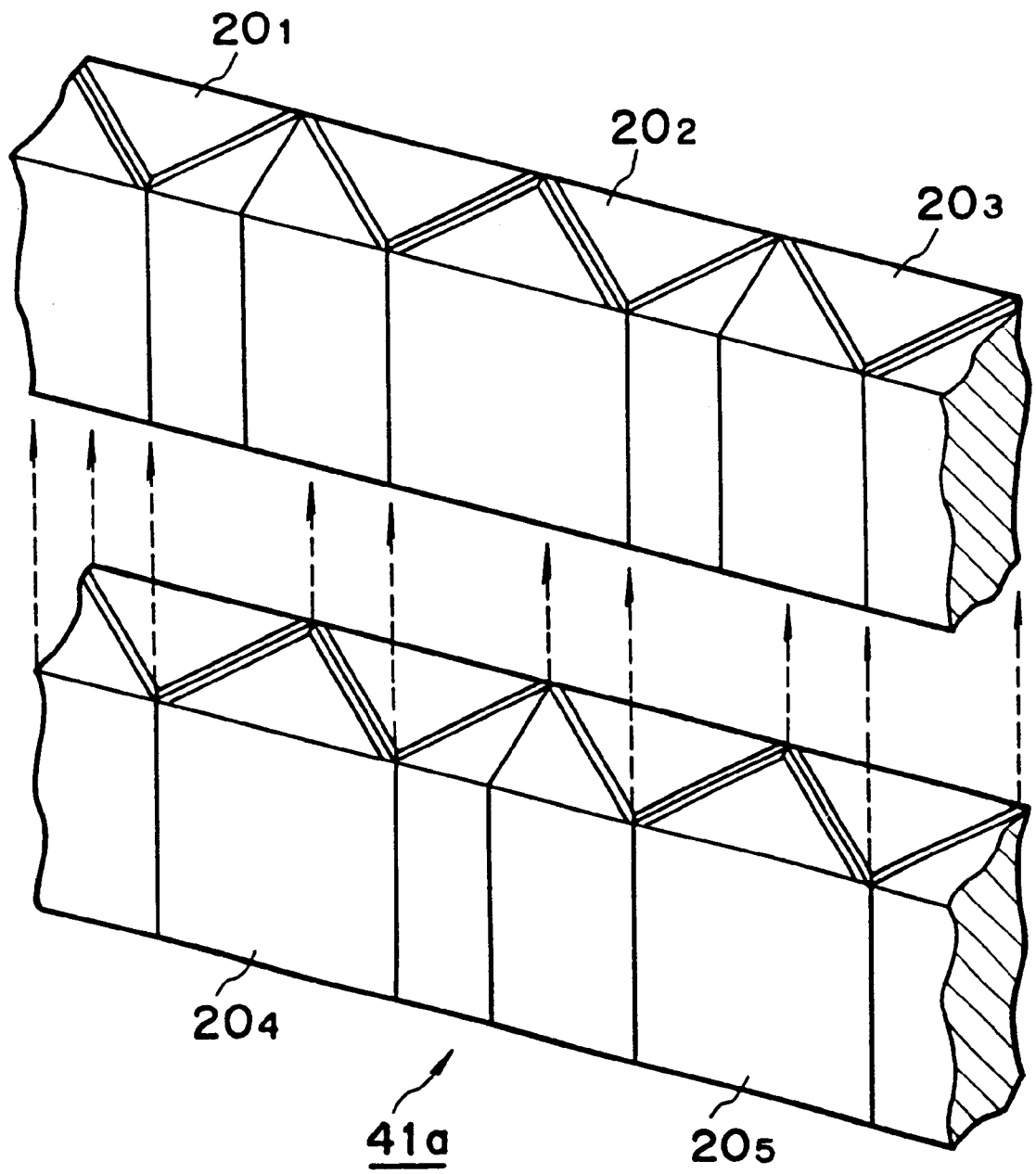
FIG. 4 is a fragmentary view showing another example of the construction of a plate-like polarizing element constructed by juxtaposing a plurality of units 20 shown in FIG. 2.

An example of the construction in which a plurality of units 20 shown in FIG. 2 are juxtaposed to construct a plate-like polarizing element is a plate-like polarizing element 41 as shown in FIG. 3 wherein a plurality of units 20 are laterally juxtaposed. Another example of the construction is a plate-like polarizing element 41a as shown in FIG. 4 wherein adjacent ones of rows each comprising a plurality of units 20 laterally juxtaposed are arranged with the pitch thereof shifted by one half. In the plate-like polarizing elements 41 and 41a shown in FIGS. 3 and 4, respectively, the incidence side prisms which provide the connecting surfaces of adjacent units (the second incidence side prism $21_2$ and the third incidence side prism $21_3$ shown in FIG. 1) may be constructed integrally with each other.

Figure 5:
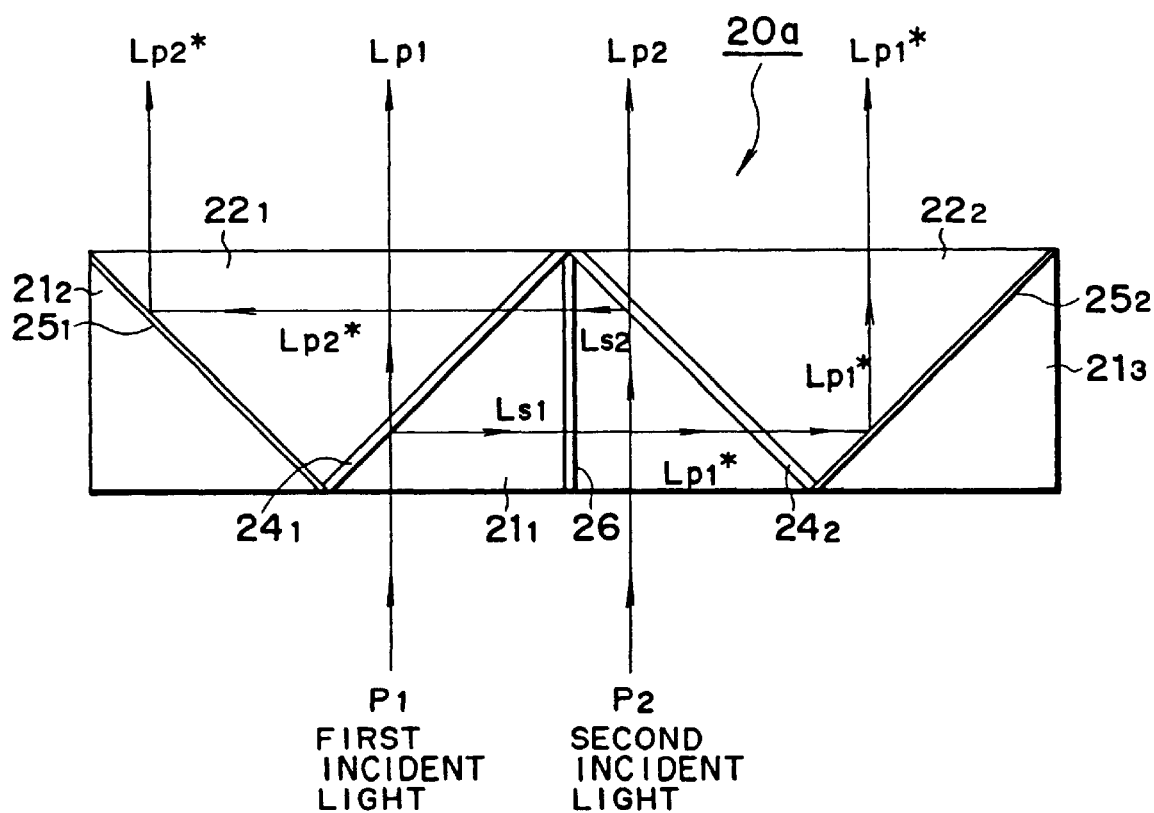
FIG. 5 is a construction view of the unit 20a of a plate-like polarizing element showing a second embodiment of the plate-like polarizing element of the present invention.

FIG. 5 is a construction view of the unit 20a of a plate-like polarizing element showing a second embodiment of the plate-like polarizing element of the present invention.

The difference of the unit 20a of the plate-like polarizing element of the present embodiment from the unit 20 of the plate-like polarizing element shown in FIG. 2 is that instead of the first and second quarter wavelength plates $23_1$ and $23_2$, a half wavelength plate 26 is provided intermediately of the surface of contact between the first incidence side prism $21_1$ and the first emergence side prism $22_1$ and the surface of contact between the first incidence side prism $21_1$ and the second emergence side prism $22_2$.

In the unit 20a of the plate-like polarizing element of the present embodiment, the first incident light $P_1$ is divided into first P-polarized light $L_{P1}$ and first S-polarized light $L_{S1}$ by the first P-polarized light $L_{P1}$ being transmitted through the first polarization separation acting film $24_1$ and the first S-polarized light being reflected rightwardly at a right angle by the first polarization separation acting film $24_1$. The first P-polarized light $L_{P1}$ emerges from the exit surface of the first emergence side prism $22_1$. On the other hand, the first S-polarized light $L_{S1}$ has its plane of polarization rotated by 90° by being transmitted through the half wavelength plate 26 and is converted into first converted P-polarized light $L_{P1}^*$. The first converted P-polarized light $L_{P1}^*$ is transmitted through the second polarization separation acting film $24_2$, whereafter it is reflected upwardly at a right angle by the second total reflection mirror $25_2$ and emerges from the exit surface of the second emergence side prism $22_2$ in the same direction as the direction of travel of the first P-polarized light $L_{P1}$. The second incident light $P_2$ is divided into second P-polarized light $L_{P2}$ and second S-polarized light $L_{S2}$ by the second P-polarized light $L_{P2}$ being transmitted through the second polarization separation acting film $24_2$ and the second S-polarized light $L_{S2}$ being reflected leftwardly at a right angle by the second polarization separation acting film $24_2$. The second P-polarized light $L_{P2}$ emerges from the exit surface of the second emergence side prism $22_2$. On the other hand, the second S-polarized light $L_{S2}$ has its plane of polarization rotated by 90° by being transmitted through the half wavelength plate 26 and is converted into second converted P-polarized light $L_{P2}^*$. The second converted P-polarized light $L_{P2}^*$ is transmitted through the first polarization separation acting film $24_1$, whereafter it is reflected upwardly at a right angle by the first total reflection mirror $25_1$ and emerges from the exit surface of the first emergence side prism $22_1$ in the same direction as the direction of travel of the second P-polarized light $L_{P2}$. Accordingly, the unit 20a of the plate-like polarizing element of the present embodiment also can convert the first and second incident lights $P_1$ and $P_2$ incident on the first incidence side prism $21_1$ into the first and second P-polarized lights $L_{P1}$ and $L_{P2}$ and the first and second converted P-polarized lights $L_{P1}{}^*$ and $L_{P2}{}^*$ without any loss and cause them to emerge from the whole exit surface. The half wavelength plate 26 may be provided anywhere between the surface of contact between the first incidence side prism $21_1$ and the first emergence side prism $22_1$ and the surface of contact between the first incidence side prism $21_1$ and the second emergence side prism $22_2$.

Figure 6:
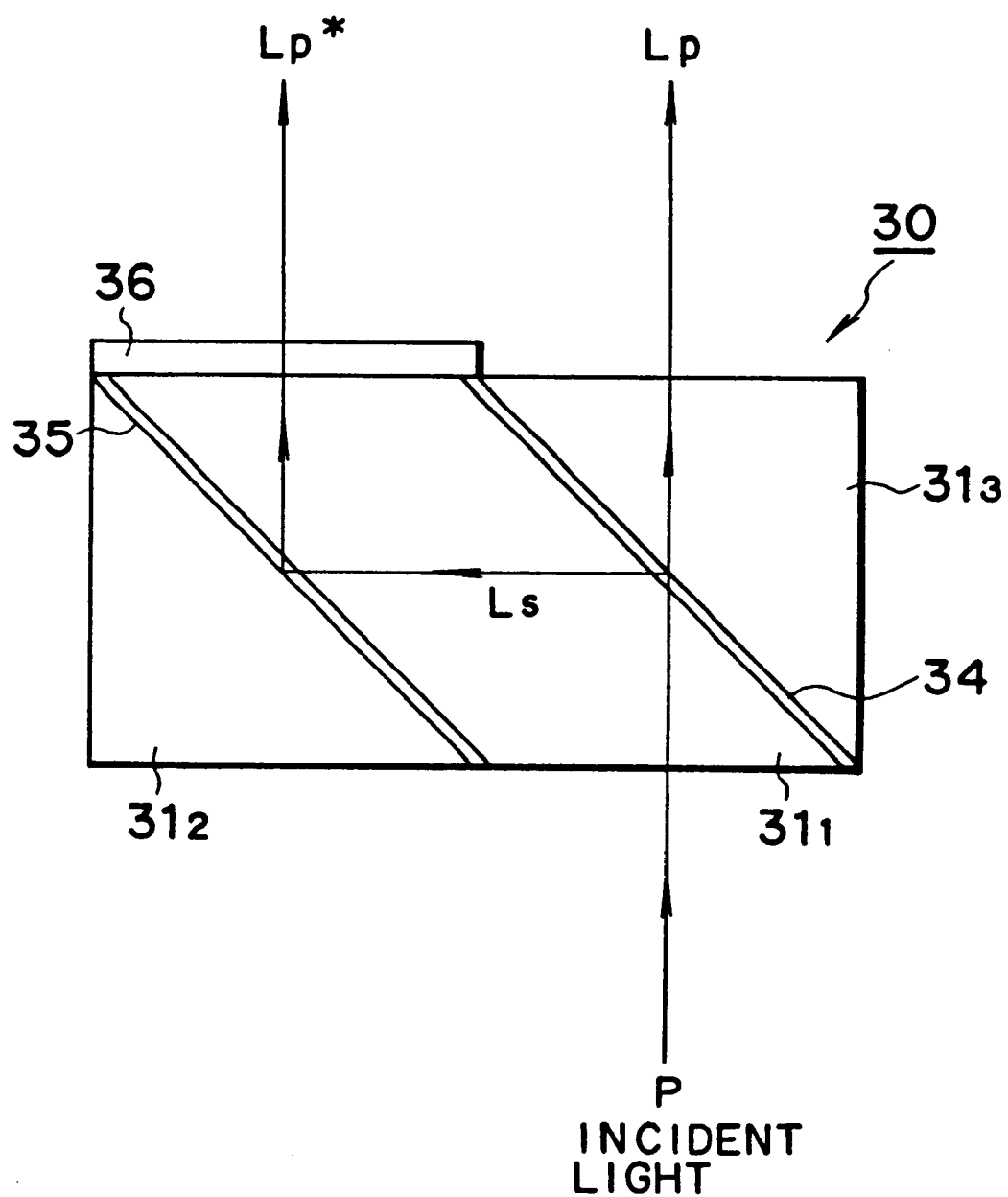
FIG. 6 is a construction view of the unit 30 of a plate-like polarizing element showing a third embodiment of the plate-like polarizing element of the present invention.

FIG. 6 is a construction view of the unit 30 of a plate-like polarizing element showing a third embodiment of the plate-like polarizing element of the present invention.

The unit 30 of the plate-like polarizing element of the present embodiment is of a construction in which a dividing portion (polarization separation acting film 34) is disposed obliquely with respect to non-polarized light (incident light P), a reflecting portion (total reflection film 35) is disposed parallel to the dividing portion and as a modulating portion, a half wavelength plate 36 is disposed in the optical path of reflected light (S-polarized light $L_S$), particularly the optical path of the reflected light (S-polarized light $L_S$) reflected by the reflecting portion (total reflection film 35).

That is, the unit 30 of the plate-like polarizing element of the present embodiment comprises a first glass member $31_1$ of parallelogrammatic cross-sectional shape and second and third glass members $31_2$ and $31_3$ of right-angled triangular cross-sectional shape arranged adjacent to the both sides of the first glass member $31_1$ with the inclined surfaces thereof in contact with one another, and the three glass members $31_1$–$31_3$ together constitute a plane parallel plate. Total reflection film 35 is provided on the surface of contact between the first glass member $31_1$ and the second glass member $31_2$, and polarization separation acting film 34 is provided on the surface of contact between the first glass member $31_1$ and the third glass member $31_3$. Further, a half wavelength plate 36 is provided on the exit surface of the first glass member $31_1$ (that surface of the first glass member which is opposite to the surface on which the incident light P is incident). The polarization separation acting film 34 has a characteristic of reflecting S-polarized light having a plane of polarization parallel to the film surface and transmitting therethrough P-polarized light having a plane of polarization perpendicular to the film surface. Also, the half wavelength plate 36 acts on light incident at an incidence angle of 90°. Accordingly, in the unit 30 of the plate-like polarizing element of the present embodiment, the polarization separation acting film 34 functions as a dividing portion which divides the incident light into reflected light (S-polarized light $L_S$) and transmitted light (P-polarized light $L_P$) whose planes of polarization are orthogonal to each other. Also, the total reflection film 35 functions as a reflecting portion which reflects one (S-polarized light $L_S$) of the reflected light and the transmitted light and directs it substantially in the same direction as the direction of travel of the other (P-polarized light $L_P$). Further, the half wavelength plate 36 functions as a modulating portion which varies the plane of polarization of at least one (S-polarized light $L_S$) of the reflected light and the transmitted light to thereby make the planes of polarization of the two lights coincident with each other.

The operation of the unit 30 of the plate-like polarizing element of the present embodiment will now be described.

The incident light P having a random plane of polarization which is incident on the film surface of the polarization separation acting film 34 at an incidence angle of 45° is divided into P-polarized light $L_P$ and S-polarized light $L_S$ by the P-polarized light $L_P$ which has a plane of polarization perpendicular to the film surface being transmitted through the polarization separation acting film 34 and the S-polarized light $L_S$ which has a plane of polarization parallel to the film surface being reflected leftwardly at a right angle by the polarization separation acting film 34. The P-polarized light $L_P$ emerges from the exit surface of the third glass member $31_3$ (that surface of the third glass member which is opposite to the surface on which the incident light P is incident). On the other hand, the S-polarized light $L_S$ is reflected upwardly at a right angle by the total reflection film 35 and emerges from the exit surface of the second glass member $31_2$ in the same direction as the direction of travel of the P-polarized light $L_P$, whereafter it is transmitted through the half wavelength plate 36, whereby it has its plane of polarization rotated by 90° and is converted into P-polarized light $L_P{}^*$. Accordingly, the unit 30 of the plate-like polarizing element of the present embodiment can convert the incident light P incident on the first glass member $31_1$ into the P-polarized light $L_P$ and the converted P-polarized light $L_P{}^*$ without any loss and cause them to emerge from the whole exit surface. In the present embodiment, polarization separation acting film can also be used in lieu of the total reflection film 35.

Examples of the construction in which a plurality of units 30 shown in FIG. 6 are juxtaposed to construct a plate-like polarizing element include the examples shown in FIGS. 3 and 4 wherein the units 30 are juxtaposed like the units 20 shown in FIG. 2. The unit 30 shown in FIG. 6 can be constructed by juxtaposing a plurality of glass members of parallelogrammatic cross-sectional shape when constructing a plate-like polarizing element and therefore, has the effect that it is more excellent in workability than the unit 20 shown in FIG. 2. The unit 30 shown in FIG. 6 can be constructed by juxtaposing a plurality of glass members of parallelogrammatic cross-sectional shape when constructing a plate-like polarizing element and therefore, has the effect that it is more excellent in workability than the unit 20 shown in FIG. 2. That is, the unit 30 can be easily made by alternately laminating glass plates having polarization separation acting film 34 provided on one surface thereof and glass plates having total reflection film 35 (for example, aluminum evaporated film) provided on one surface thereof, severing them along a cross-section of 45°, optically polishing the severed surfaces, and thereafter adhesively securing a half wavelength plate 36 thereto.

Figure 7:
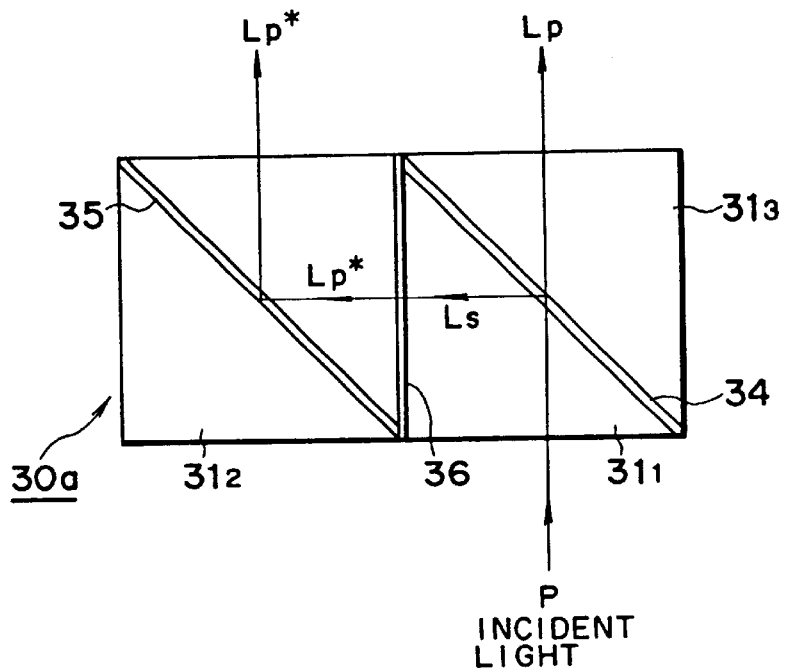
FIG. 7 is a construction view of the unit 30a of a plate-like polarizing element showing a fourth embodiment of the plate-like polarizing element of the present invention.

FIG. 7 is a construction view of the unit 30a of a plate-like polarizing element showing a fourth embodiment of the plate-like polarizing element of the present invention.

The difference of the unit 30a of the plate-like polarizing element of the present embodiment from the unit 30 of the plate-like polarizing element shown in FIG. 6 is that a half wavelength plate 36 is disposed between polarization separation acting film 34 (a dividing portion) and total reflection film 35 (a reflecting portion).

In the unit 30a of the plate-like polarizing element of the present embodiment, the incident light P is divided into P-polarized light $L_P$ and S-polarized light $L_S$ by the P-polarized light $L_P$ being transmitted through the polarization separation acting film 34 and the S-polarized light $L_S$ being reflected leftwardly at a right angle by the polarization separation acting film 34. The P-polarized light $L_P$ emerges from the exit surface of the third glass member $31_3$. On the other hand, the S-polarized light $L_S$ has its plane of polarization rotated by 90° by being transmitted through the half wavelength plate 36 and is converted into P-polarized light $L_P$*, whereafter it is reflected upwardly at a right angle by the total reflection film 35 and emerges from the exit surface of the second glass member $31_2$ in the same direction as the direction of travel of the P-polarized light $L_P$. Accordingly, the unit 30a of the plate-like polarizing element of the present embodiment can convert the incident light P incident on the first glass member $31_1$ into the P-polarized light $L_P$ and the converted P-polarized light $L_P$* without any loss and cause them to emerge from the whole exit surface.

Figure 8:
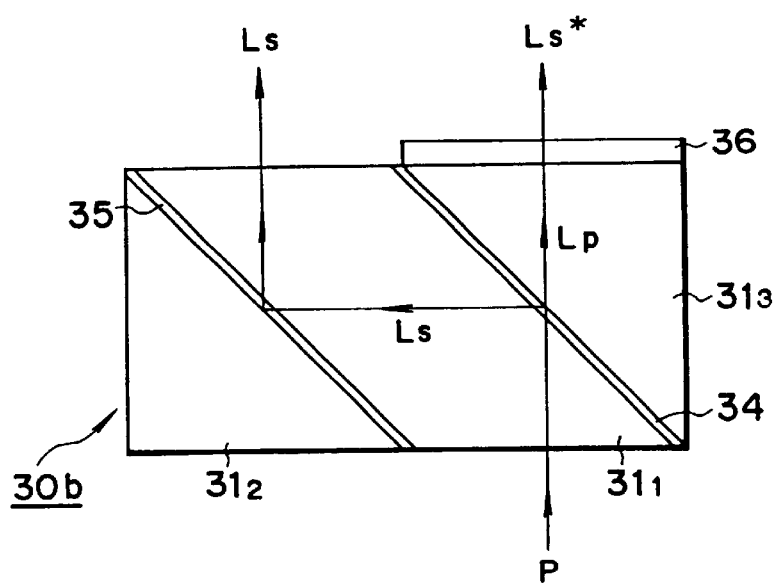
FIG. 8 is a construction view of the unit 30b of a plate-like polarizing element showing a fifth embodiment of the plate-like polarizing element of the present invention.

FIG. 8 is a construction view of the unit 30b of a plate-like polarizing element showing a fifth embodiment of the plate-like polarizing element of the present invention.

The difference of the unit 30b of the plate-like polarizing element of the present embodiment from the unit 30 of the plate-like polarizing element shown in FIG. 6 is that the half wavelength plate 36 is adhesively secured to the exit surface of the third glass member $31_3$ which is the optical path of transmitted light (P-polarized light $L_P$).

In the unit 30b of the plate-like polarizing element of the present embodiment, the incident light P is divided into P-polarized light $L_P$ and S-polarized light $L_S$ by the P-polarized light $L_P$ being transmitted through the polarization separation acting film 34 and the S-polarized light $L_S$ being reflected leftwardly at a right angle by the polarization separation acting film 34. The P-polarized light $L_P$ emerges from the exit surface of the third glass member $31_3$, whereafter it is transmitted through the half wavelength plate 36 and thereby has its plane of polarization rotated by 90° and is converted into S-polarized light $L_S$* and emerges. On the other hand, the S-polarized light $L_S$ is reflected upwardly at a right angle by the total reflection film 35 and emerges from the exit surface of the second glass member $31_2$ in the same direction as the direction of travel of the converted S-polarized light $L_S$*. Accordingly, the unit 30b of the plate-like polarizing element of the present embodiment can convert the incident light P incident on the first glass member $31_1$ into the S-polarized light $L_S$ and the converted S-polarized light $L_S$* without any loss and cause them to emerge from the whole exit surface.

In the present embodiment, polarization separation acting film can be used in lieu of the total reflection film 35.

Again in the embodiments of FIGS. 6, 7 and 8, a single unit can be used as the polarizing element instead of a plurality of units being juxtaposed. In such case, a member for absorbing or reflecting the light travelling toward the second glass member $31_2$ can be disposed on the entrance side of the second glass member $31_2$, or light condensing means for directing the light travelling toward the second glass member $31_2$ to the first glass member $31_1$ can be disposed. If this is done, the polarizing element, i.e., the unit 30, can be made to have substantially the same width as the width of the illuminating light beam, and there can be realized a polarizing element of about half the size of the conventional polarizing element shown in FIG. 1 in each of the direction of the optical axis and a direction perpendicular to the optical axis.

Figure 9:
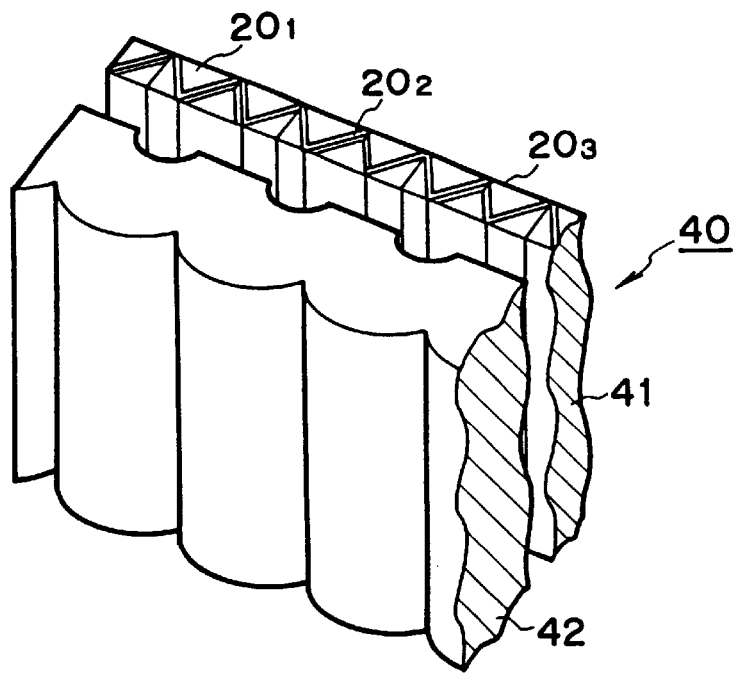
FIG. 9 is a perspective view showing a portion of a first embodiment of the polarizing conversion unit of the present invention.

FIG. 9 is a perspective view showing a portion of a first embodiment of the polarizing conversion unit of the present invention.

Figure 10:
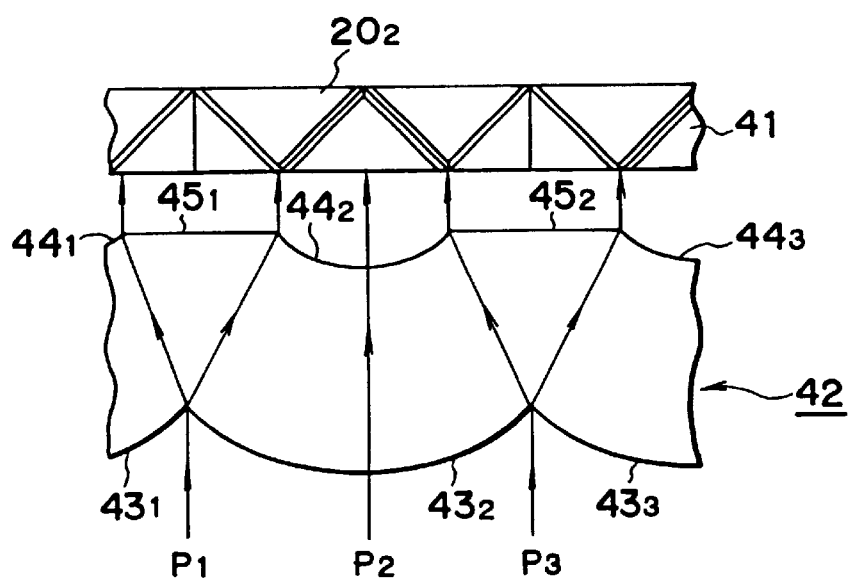
FIG. 10 illustrates the operation of a both-surface lenticular lens 42 shown in FIG. 9.

The polarizing conversion unit 40 of the present embodiment comprises the plate-like polarizing element 41 shown in FIG. 3, and a both-surface lenticular lens 42 which is provided on the incidence side of the plate-like polarizing element 41 and which is converting means for converting non-polarized light into non-polarized light of a lattice-like pattern. The plate-like polarizing element 41 is disposed so as to be substantially orthogonal to the optical axis of non-polarized light of a lattice-like pattern emerging from the both-surface lenticular lens 42, and transmits the non-polarized light of a lattice-like pattern therethrough and converts it into substantially dense polarized-light. Also, as shown in FIG. 10, on the incidence side surface of the both-surface lenticular lens 42 for incident lights $P_1$–$P_3$ (non-polarized lights), convergence acting surfaces $43_1$–$43_3$ comprising positive power lenses having the function of converging the incident lights $P_1$–$P_3$ are provided at the same pitch as the units $20_1$–$20_3$ of the plate-like polarizing element 41. Also, on the emergence side surface of the both-surface lenticular lens 42 for the incident lights $P_1$–$P_3$, divergence acting surfaces $44_1$–$44_3$ comprising negative power lenses having the function of causing the converged incident lights $P_1$–$P_3$ to diverge and become parallel lights are provided so as to be opposed to the first incidence side prisms $21_1$ (see FIG. 2) of the units $20_1$–$20_3$. Further, non-acting surfaces $45_1$ and $45_2$ which are flat surfaces are provided between the divergence acting surfaces $44_1$–$44_3$.

Accordingly, incident lights $P_1$–$P_3$ incident on the entrance surface of the both-surface lenticular lens 42 perpendicularly thereto are converged by the convergence acting surfaces $43_1$–$43_3$, whereby as shown in FIG. 10, they do not enter the non-acting surfaces $45_1$ and $45_2$ but enter only the divergence acting surfaces $44_1$–$44_3$, whereafter they are made into parallel lights by the divergence acting surfaces $44_1$–$44_3$ and emerge therefrom and therefore, the light emerging from the both-surface lenticular lens 42 becomes non-polarized light of a lattice-like pattern. This non-polarized light of a lattice-like pattern is converted into polarized light by the plate-like polarizing element 41, whereafter it emerges from the whole of the exit surfaces of the units $20_1$–$20_3$. By making the absolute value of the focal length of the divergence acting surfaces $44_1$–$44_3$ half the focal length of the convergence acting surfaces $43_1$–$43_3$, the beam width of the non-polarized light of a lattice-like pattern emerging from the both-surface lenticular lens 42 can be made half the pitch of the convergence acting surfaces $43_1$–$43_3$. Also, by providing absorbent film on the non-acting surfaces $45_1$ and $45_2$ the adverse effect by irregular reflection or the like can be mitigated.

The polarizing conversion unit 40 of the present embodiment has the following advantages:

(1) Since the incident lights $P_1$–$P_3$ are converted into non-polarized lights of a lattice-like pattern by the both-surface lenticular lens 42 and are caused to enter the units $20_1$–$20_3$ of the plate-like polarizing element 41, the sizes of the units $20_1$–$20_3$ can be made small. Also, to make the sizes of the units $20_1$–$20_3$ of the plate-like polarizing element 41 further smaller, the pitch of the convergence acting surfaces $43_1$–$43_3$ of the both-surface lenticular lens 42 can be made small and the number of divisions of the lattice-like pattern can be increased.

(2) Even if the light source is one having a finite diameter, the incident lights $P_1$–$P_3$ enter the first and second polarization separation acting films $24_1$ and $24_2$ of the units $20_1$–$20_3$ of the plate-like polarizing element 41 without fail and therefore, the utilization efficiency of the light and the degree of polarization of the emergent light can be improved. Particularly, the reflectance of the first and second polarization separation acting films $24_1$ and $24_2$ for S-polarized light can be relatively easily made 100% and therefore, the degree of polarization of the emergent light can be kept high.

(3) The first, second and third incidence side prisms $21_1$–$21_3$ and the first and second emergence side prisms $22_1$ and $22_2$ which are the constituents of the units $20_1$–$20_3$ of the plate-like polarizing element 41 can be made identical in shape and size and therefore, in the process of manufacture, the kinds of parts can be decreased and low cost can be achieved. Particularly, the kinds of the prisms which occupy a great rate in terms of cost can be decreased and therefore, the effect of low cost is very great.

When the ease of molding and optical characteristics such as transmittance, etc. are taken into account, the both-surface lenticular lens 42 may be one provided by extrusion-molding or compression-molding an acryl plate. However, where the heat resisting property is particularly required, it is preferable to use one provided by compression-molding or polish-molding a glass member. Also, the both-surface lenticular lens 42 may be constructed by unitary molding, or may be constructed by cementing one-surface lenticular lenses together. Also, where the light source has a finite diameter, the ratio between the light beam presence area and the light beam absence area of the non-polarized light of a lattice-like pattern can be made 1:1 by making the absolute value of the focal length of the divergence acting surfaces $44_1$–$44_3$ less than half the focal length of the convergence acting surfaces $43_1$–$43_3$.

The polarizing conversion unit 40 of the present embodiment is constructed by the use of the plate-like polarizing element 41 shown in FIG. 3 and the both-surface lenticular lens 42, but alternatively, it may be constructed by the use of a plate-like polarizing element comprising the units 20a, 30, 30a, 30b shown in FIGS. 5–8 and a both-surface lenticular lens.

A second embodiment of the polarizing conversion unit of the present invention will now be described.

The polarizing conversion unit of the present embodiment comprises the plate-like polarizing element 41a shown in FIG. 4, and a both-surface fly-eye lens which is converting means for converting non-polarized light into non-polarized light of a two-dimensional lattice-like pattern provided on the entrance side of the plate-like polarizing element 41a. In the polarizing conversion unit of the present embodiment, the incident light is vertically and horizontally divided by the both-surface fly-eye lens, whereafter it is caused to enter the first incidence side prism $21_1$ of each unit $20_1$–$20_5$ of the plate-like polarizing element 41a. Again in the present embodiment, the polarizing conversion unit may be constructed by the use of a plate-like polarizing element comprising the units 20a, 30, 30a, 30b shown in FIGS. 5–8 and a both-surface fly-eye lens.

Figure 11:
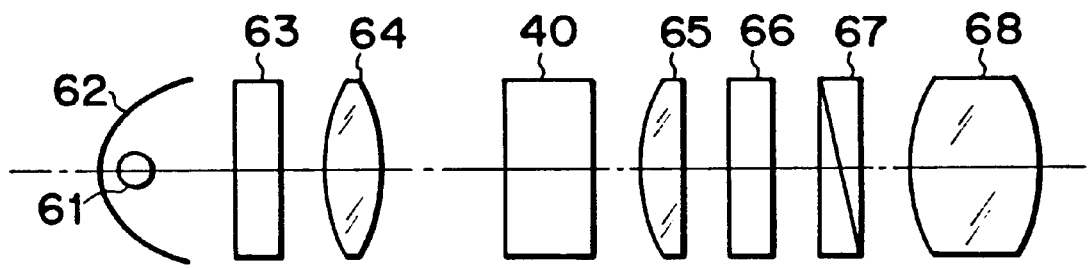
FIG. 11 is a schematic construction view showing a first embodiment of the projector of the present invention.

FIG. 11 is a schematic construction view showing a first embodiment of the projector of the present invention.

The projector of the present embodiment differs from the projector shown in FIG. 1 in that it uses the polarizing conversion unit 40 shown in FIG. 9 as an illuminating optical system for converting the parallel white light (non-polarized light) from a first condenser lens 64 into white rectilinearly polarized light. In the projector of the present embodiment, a second condenser lens 65 for condensing the white rectilinearly polarized light from the polarizing conversion unit 40 into the pupil of a projection lens 68 is provided between the polarizing conversion unit 40 and a liquid crystal light bulb 66.

Accordingly, the projector of the present embodiment illuminates the liquid crystal light bulb 66 by the use of the polarizing conversion unit 40 which is the polarizing conversion unit of the present invention and therefore, white light (non-polarized light) emitted from a light source 61 can be caused to enter the liquid crystal light bulb 66 without any loss and the distance from the light source 61 to the liquid crystal light bulb 66 can be made short and thus, the projector can be made compact.

Figure 12:
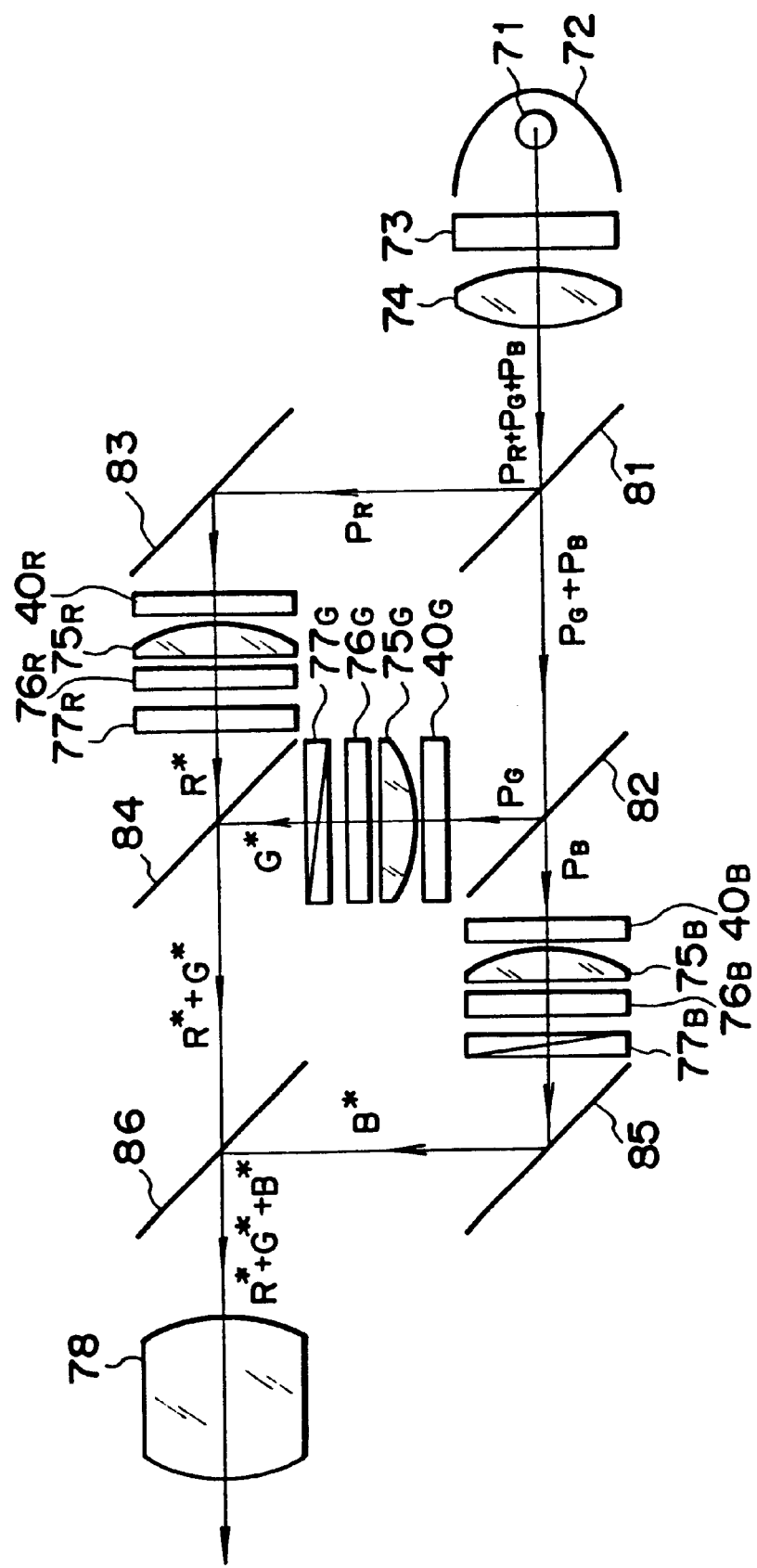
FIG. 12 is a schematic construction view showing a second embodiment of the projector of the present invention.

FIG. 12 is a schematic construction view showing a second embodiment of the projector of the present invention.

The projector of the present embodiment comprises a light source 71 emitting non-polarized light (white light), a reflecting mirror 72, a heat cut filter 73, a first condenser lens 74, an illuminating optical system for converting the non-polarized light from the light source into polarized light, an image generating portion for generating an image by modulating the polarized light in conformity with a video signal, and a projecting optical system for projecting system is comprised of a color resolving system comprising a first resolving dichroic mirror 81, a second resolving dichroic mirror 82 and a resolving and reflecting mirror 83 for resolving the white light which is non-polarized light into red, green and blue non-polarized lights, respectively, polarizing conversion units $40_R$, $40_G$ and $40_B$ provided in the optical paths of the respective non-polarized lights and similar in construction to the polarizing conversion unit 40 shown in FIG. 9, a condenser lens $75_R$ for red, a condenser lens $75_G$ for green and a condenser lens $75_B$ for blue. The image generating portion comprises a liquid crystal light bulb $76_R$ for red, a liquid crystal light bulb $76_G$ for green and a liquid crystal light bulb $76_B$ for blue which are three generators for generating red, green and blue images, respectively. Further, the projecting optical system comprises a first combining dichroic mirror 84, a combining and reflecting mirror 85, a second combining dichroic mirror 86 and a projection lens 78.

In the projector of the present embodiment, red non-polarized light $P_R$ is reflected upwardly at a right angle by the first resolving dichroic mirror 81, blue non-polarized light $P_B$ of cyan non-polarized light $P_G+P_B$ transmitted through the first resolving dichroic mirror 81 is transmitted through the second resolving dichroic mirror 82 and green non-polarized light $P_G$ is reflected upwardly at a right angle by the second resolving dichroic mirror 82, whereby parallel white light $P_R+P_G+P_B$ emerging from the first condenser lens 74 which is non-polarized light is resolved into red, green and blue non-polarized lights $P_R$, $P_G$ and $P_B$. The red non-polarized light $P_R$ is reflected leftwardly at a right angle by the resolving and reflecting mirror 83, whereafter it enters the polarizing conversion unit $40_R$ for red and is converted thereby into red polarized light. The green non-polarized light $P_G$ is reflected by the second resolving dichroic mirror 82, whereafter it enters the polarizing conversion unit $40_G$ for green and is converted thereby into green polarized light. Further, the blue non-polarized light $P_B$ is transmitted through the second resolving dichroic mirror 82, whereafter it enters the polarizing conversion unit $40_B$ for blue and is converted thereby into blue polarized light.

The red polarized light enters the liquid crystal light bulb $76_R$ for red through the condenser lens $75_R$ for red, and has its plane of polarization rotated in conformity with the red component of a color video signal, whereby it is modulated and becomes a light beam including both of P-polarized light and S-polarized light, and is further converted into rectilinearly polarized red image light R* by a polarizing plate $77_R$ for red. Likewise, the green polarized light is converted into green image light G* modulated by the action of the liquid crystal light bulb $76_G$ for green and a polarizing plate $77_G$ for green in conformity with the green component of the color video signal, and the blue polarized light is converted into blue image light B* modulated by the action of the liquid crystal light bulb $76_B$ for blue and a polarizing plate $77_B$ for blue in conformity with the blue component of the color video signal.

The red image light R* and the green image light G* are combined by the first combining dichroic mirror 84 and converted into yellow image light R* +G*, whereafter it enters the second combining dichroic mirror 86. The blue image light B* is reflected upwardly at a right angle by the combining and reflecting mirror 85, whereafter it enters the second combining dichroic mirror 86. The yellow image light R*+G* is transmitted through the second combining dichroic mirror 86 and the blue image light B* is reflected leftwardly at a right angle by the second combining dichroic mirror 86, whereby the yellow image light R*+G* and the blue image light B* are combined and converted into white image light R*+G*+B* modulated in conformity with the color video signal. The white image light R*+G*+B* is enlarged and projected onto a screen (not shown) by the projection lens 78 and thus, a color image is displayed on the screen.

The projector of the present embodiment has a polarizing conversion unit for each of red, green and blue non-polarized lights $P_R$, $P_G$ and $P_B$ and thus, has the following effects:

(1) Since it is difficult to make the wavelength dependency of the quarter wavelength plate and polarization separation acting film (see FIG. 2) used in each of the polarizing conversion unit $40_R$ for red, the polarizing conversion unit $40_G$ for green and the polarizing conversion unit $40_B$ for blue zero, it can more improve to use red, green and blue non-polarized lights $P_R$, $P_G$ and $P_B$ as the incident light than to use wide-band non-polarized light like parallel white light $P_R+P_G+P_B$ as the incident light.

(2) Generally, the light source 71 has a finite diameter and therefore, white light emitted from the light source 71 always has a finite angle of expanse. If the beam diameter of light having a finite angle of expanse is compressed by some optical system, the angle of expanse will become greater in inverse proportion to the compression ratio of the beam diameter. Accordingly, in the prior-art projector shown in FIG. 1, the light condensing efficiency onto the liquid crystal light bulb 117 will be reduced by an increase in the angle of expanse of light even if the beam diameter of light having a finite angle of expanse is compressed, because the distance between the polarizing conversion unit and the liquid crystal light bulb 117 is great. On the other hand, in the projector of the present embodiment, thin planar polarizing conversion units are used and therefore, these polarizing conversion units can be installed in proximity to the liquid crystal light bulbs and thus, the reduction in the light condensing efficiency onto the liquid crystal light bulb 117 by an increase in the angles of expanse of the red, green and blue non-polarized lights $P_R$, $P_G$ and $P_B$.

A third embodiment of the projector of the present invention will now be described.

The projector of the present embodiment differs from the projector shown in FIG. 12 in that it has a polarizing conversion unit for cyan provided between the first resolving dichroic mirror 81 and the second resolving dichroic mirror 82 (i.e., in the common optical path of the green non-polarized light $P_G$ and the blue non-polarized light $P_B$), in lieu of the polarizing conversion unit $40_G$ for green and the polarizing conversion unit $40_B$ for blue.

Where a plurality of polarizing conversion units are used, it is better from the viewpoints of the utilization efficiency of the light emitted from the light source and the suppression of the occurrence of color irregularity to dispose the polarizing conversion units at optically equivalent positions (positions equivalent in the direction of travel, amplitude, etc. of the light) and therefore, it is desirable to construct the projector like that shown in FIG. 12, but where preference is given to the curtailment of the number of parts, even if the projector is constructed like that of the present embodiment to thereby decrease the number of polarizing conversion units, the utilization efficiency of light can be more improved than in the prior-art projector and the entire apparatus can be made compact.

In the projector shown in FIG. 12, as the polarizing conversion units $40_R$, $40_G$ and $40_B$ for respective colors, use may be made of ones each comprising a combination of a plate-like polarizing element consisting of the unit 20*a*, 30, 30*a*, 30*b* shown in FIGS. 5–8 and a both-surface lenticular lens, or ones each comprising a combination of the plate-like polarizing element 41*a* ahown in FIG. 4 and a both-surface fly-eye lens. The construction of the projector of the present invention is not restricted to the construction shown in FIG. 12, but in a projector as described in Japanese Laid-Open Patent Application No. 62-59919 wherein white light is resolved into respective color lights by the use of respective color filters and the respective color lights modulated by a liquid crystal light bulb are combined by a cube prism, the polarizing conversion unit 40 shown in FIG. 9 may be disposed for each of the color filters. Also, in a projector as described in Japanese Laid-Open Patent Application No. 62-1391 wherein white light is resolved into respective color lights by a first cube prism and the color lights modulated by a reflection type liquid crystal light bulb are combined by a second cube prism, the polarizing conversion unit 40 shown in FIG. 9 may be disposed on the exit surface of the first cube prism for each color light.

As described above, the present invention has the following effects.

The polarizing element of the present invention can be made small in the size thereof for the direction of travel of the incident light and a direction perpendicular to the direction of travel of the incident light. Also, the polarizing element of the present invention can be made compact and by juxtaposing a plurality of such elements, the size thereof for the direction of travel of the incident light can be made much smaller. The polarizing conversion unit of the present invention can cause the incident light to enter, without any loss, the plate-like polarizing element of the present invention having between units an area in which the incident light is intercepted when a plurality of polarizing elements are juxtaposed, and can convert the incident light into polarized light without any loss by the plate-like polarizing element and cause it to emerge therefrom and therefore, can improve the utilization efficiency of light. Further, the projector of the present invention can convert non-polarized light emitted from the light source into polarized light without any loss by the polarizing conversion unit and can therefore improve the utilization efficiency of light and can make the distance between the polarizing conversion unit and the image generator small, and this leads to the compactness of the entire apparatus.

What is claimed is:

1. An image projecting apparatus comprising:
   supplying means for supplying polarized light;
   forming means for forming an image light with said polarized light, said forming means including at least one light modulating element for modulating the polarizing light and at least one polarizing plate for receiving said modulated polarized light, said polarizing plate being provided separately from said light modulating element; and projecting means for projecting said image light, said projecting means having a pupil;

wherein said supplying means comprises:
    a lens array for separating light from a light source into a plurality of light beams;
    a polarizing beam splitter array for splitting each of said plurality of light beams into P-polarized light and S-polarized light;
    a $\lambda/2$ film array for making polarization directions of said P-polarized lights and said S-polarized lights consistent; and
    a condenser system for condensing said P-polarized lights and said S-polarized lights whose polarization directions have been mutually consistent to said forming means and for directing them to the pupil of said projecting means.

2. An apparatus according to claim 1, wherein said forming means is provided with a liquid crystal display.

3. An apparatus according to claim 1, wherein said splitting means is provided with a polarization separating film and further comprising a reflecting film array for reflecting said S-polarized lights.

4. An apparatus according to claim 1, wherein said lens system includes a convex lens.

5. An apparatus according to claim 1, wherein said forming means has a liquid crystal display.

6. An apparatus according to claim 1, wherein said image light includes lights of each of red, green and blue colors and said forming means has three liquid crystal displays corresponding to each of said red, green and blue colors.

7. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light, said projecting means having a pupil;
wherein said supplying means comprises:
    a lens array for separating light from a light source into a plurality of light beams;
    a polarizing beam splitter array for splitting each of said plurality of light beams into P-polarized light and S-polarized light;
    a pair of $\lambda/4$ film array for making polarization directions of said P-polarized lights and said S-polarized lights consistent; and
    a condenser system for condensing said P-polarized light and said S-polarized light whose polarization directions have been mutually consistent to said forming means and for directing them to the pupil of said projecting means.

8. An apparatus according to claim 7, wherein said forming means is provided with a liquid crystal display.

9. An apparatus according to claim 7, wherein said supplying means comprises a reflecting film array for reflecting said S-polarized lights and wherein said splitting means is provided with a polarization separating film.

10. An apparatus according to claim 7, wherein said image light includes lights of each of red, green and blue colors and said forming means has three liquid crystal displays corresponding to each of said red, green and blue colors.

11. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light, said projecting means having a pupil;
wherein said supplying means comprises:
    a fly-eye lens for separating light from a light source into a plurality of light beams;
    a polarizing converter array for converting each of said plurality of light beams into polarized lights whose polarization directions have been mutually consistent, without substantially losing light energy; and
    a condenser system for condensing said polarized lights whose polarization directions have been mutually consistent to said forming means and for directing them to the pupil of said projecting means.

12. An apparatus according to claim 1, wherein said forming means is provided with a liquid crystal display.

13. An apparatus according to claim 11, wherein said supply means comprises a reflecting film array for reflecting said S-polarized lights and wherein said splitting means is provided with a polarization separating film.

14. An apparatus according to claim 11, wherein said lens system includes a convex lens.

15. An apparatus according to claim 11, wherein said image light includes lights of each of red, green and blue colors and said forming means has three liquid crystal displays corresponding to each of said red, green and blue colors.

16. An image projecting apparatus comprising:
supplying means for supplying a polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light;
wherein said supplying means comprises:
    a fly-eye lens for separating light from a light source into a plurality of light beams;
    a polarizing converter array for converting each of said plurality of light beams into polarized lights whose polarization directions have been mutually consistent, without substantially losing light energy; and
    a condenser system for condensing said polarized lights whose polarization directions have been mutually consistent to said forming means.

17. An apparatus according to claim 16, wherein said forming means is provided with a liquid crystal display.

18. An apparatus according to claim 16, wherein said supplying means comprises a reflecting film array for reflecting said s-polarized lights and wherein said splitting means is provided with a polarization separating film.

19. An apparatus according to claim 16, wherein said forming means is provided with a liquid crystal display.

20. An apparatus according to claim 16, wherein said image light includes lights of each of red, green and blue colors and said forming means has three liquid crystal displays corresponding to each of said red, green and blue colors.

21. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light;
wherein said supplying means comprises:
  a lens array for separating light from a light source into a plurality of light beams;
  polarizing means for converting each of said plurality of light beams into polarized lights whose polarization directions have been mutually consistent, without substantially losing light energy; and
  an optical system for directing said polarized lights whose polarization directions have been mutually consistent to said forming means.

22. An apparatus according to claim 21, wherein said forming means is provided with a liquid crystal display.

23. An apparatus according to claim 21, wherein said system for directing and converging includes a convex lens.

24. An apparatus according to claim 21, wherein said image light includes lights of each of red, green and blue colors and said forming means has three liquid crystal displays corresponding to each of said red, green and blue colors.

25. An image projecting apparatus comprising:
supplying means for supplying polarized light;
forming means for forming an image light with said polarized light to form an image light, said forming means including at least one light modulating element for modulating the polarizing light and at least one polarizing plate for receiving said modulated polarized light, said polarizing plate being provided separately from said light modulating element; and
projecting means for projecting said image light;
wherein said supplying means comprises:
  a lens array for separating light from a light source into a plurality of light beams;
  polarizing converter array for converting each of said plurality of light beams into polarized lights whose polarization directions have been mutually consistent, without substantially losing light energy; and
  an optical system for directing said polarized lights whose polarization direction have been mutually consistent to said forming means.

26. An apparatus according to claim 25, wherein said image light includes lights of each of red, green and blue colors and said forming means has three liquid crystal displays corresponding to each of said red, green and blue colors.

27. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light;
wherein said supplying means comprises:
  a fly-eye lens for separating light from a light source into a plurality of light beams;
  a polarizing beam splitter array for splitting each of said plurality of light beams into P-polarized light and S-polarized light;
  a $\lambda/2$ film array for making polarization directions of said P-polarized lights and S-polarized lights mutually consistent; and
  an optical system for directing said P-polarized lights and said S-polarized lights whose polarization directions have been mutually consistent to said forming means.

28. An apparatus according to claim 27, wherein said lens system includes a convex lens.

29. An apparatus according to claim 27, wherein said forming means has a liquid crystal display.

30. An apparatus according to claim 27, wherein said image light includes lights of each of red, green and blue colors and said forming means has three liquid crystal displays corresponding to each of said red, green and blue colors.

31. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and
projecting means for projecting said image light;
wherein said supplying means comprises:
  a fly-eye lens for separating light from a light source into a plurality of light beams;
  a polarizing beam splitter array for splitting each of said plurality of light beams into P-polarized light and S-polarized light;
  a pair of $\lambda/4$ film array for making polarization directions of said P-polarized lights and said S-polarized lights mutually consistent; and
  an optical system for directing said P-polarized lights and said S-polarized lights whose polarization directions have been mutually consistent to said forming means.

32. An apparatus according to claim 31, wherein said forming means is provided with a liquid crystal display.

33. An apparatus according to claim 31, wherein said image light includes lights of each of red, green and blue colors and said forming means has three liquid crystal displays corresponding to each of said red, green and blue colors.

34. An image projecting apparatus comprising:
supplying means for supplying polarized light;
forming means for forming an image light with said polarized light, said forming means including at least one light modulating element for modulating the polarizing light and at least one polarizing plate for receiving said modulated polarized light, said polarizing plate being provided separately from said light modulating element; and projecting means for projecting said image light, said projecting means having a pupil;

wherein said supplying means comprises:

a lens array for separating light from a light source into a plurality of light beams;

splitting means for splitting each of said plurality of light beams into P-polarized light and S-polarized light;

a pair of λ/4 member array for making polarization directions of said P-polarized lights and said S-polarized lights mutually consistent; and an optical system for directing said P-polarized lights and said S-polarized lights whose polarization directions have been mutually consistent to said forming means.

35. An apparatus according to claim 34, wherein said optical system includes a convex lens.

36. An apparatus according to claim 34, wherein said forming means has a liquid crystal display.

37. An apparatus according to claim 34, wherein said image light includes lights of each of red, green and blue colors and said forming means has three liquid crystal displays corresponding to each of said red, green and blue colors.

38. An image projecting apparatus comprising:

supplying means for supplying polarized light;

forming means for forming an image light with said polarized light, said forming means including at least one light modulating element for modulating the polarizing light and at least one polarizing plate for receiving said modulated polarized light, said polarizing plate being provided separately from said light modulating element; and projecting means for projecting said image light;

wherein said supplying means comprises:

a lens array for separating light from a light source into a plurality of light beams;

splitting means for splitting each of said plurality of light beams into P-polarized light and S-polarized light;

a λ/2 member array for making polarization directions of said P-polarized lights and said S-polarized lights mutually consistent; and an optical system for directing said P-polarized lights and said S-polarized lights whose polarization directions have been mutually consistent to said forming means.

39. An apparatus according to claim 38, wherein said forming means has a liquid crystal display.

40. An apparatus according to claim 38, wherein said image light includes lights of each of red, green and blue colors and said forming means has three liquid crystal displays corresponding to each of said red, green and blue colors.

* * * * *

UNITED STATES PATENT AND TRADEMARK OFFICE
CERTIFICATE OF CORRECTION

PATENT NO.     : 6,229,646 B1                                                         Page 1 of 1
DATED          : May 8, 2001
INVENTOR(S)    : Hideaki Mitsutake et al.

It is certified that error appears in the above-identified patent and that said Letters Patent is hereby corrected as shown below:

Column 3,
Line 39, "$22_1$" should read -- $21_1$ --

Column 16,
Line 28, "claim 1," should read -- claim 11, --.

Signed and Sealed this

Sixteenth Day of July, 2002

*Attest:*

*Attesting Officer*

JAMES E. ROGAN
*Director of the United States Patent and Trademark Office*